United States Patent [19]

Stoakley et al.

[11] 4,134,929

[45] Jan. 16, 1979

[54] ALLYL 2-CYANOACRYLATE-BASED ORTHODONTIC BRACKET ADHESIVE

[75] Inventors: Diane M. Stoakley, Church Hill; John R. Dombroski, Kingsport, both of Tenn.

[73] Assignee: Eastman Kodak Company, Rochester, N.Y.

[21] Appl. No.: 708,158

[22] Filed: Jul. 23, 1976

[51] Int. Cl.² ............................................. C08L 33/14
[52] U.S. Cl. .................................. 260/881; 32/14 A; 32/15; 260/885
[58] Field of Search ............... 260/881, 885; 32/14 A, 32/15

[56] References Cited

U.S. PATENT DOCUMENTS

| | | | |
|---|---|---|---|
| 3,250,003 | 5/1966 | Collito | 32/14 A |
| 3,640,972 | 2/1972 | Bolger et al. | 260/881 |
| 3,647,498 | 3/1972 | Dougherty | 260/881 |
| 3,654,239 | 4/1972 | McIntire et al. | 260/881 |
| 3,766,132 | 10/1973 | Lee et al. | 32/15 |
| 3,832,334 | 8/1974 | O'Sullivan et al. | 526/271 |

*Primary Examiner*—Harold D. Anderson

*Attorney, Agent, or Firm*—Edward R. Weber; Daniel B. Reece, III

[57] ABSTRACT

An adhesive composition comprising Components A, B and C as follows:
  A. a polymerizable monomeric allyl 2-cyanoacrylate containing portion comprising
    1. from about 75 to about 92 parts by weight of allyl 2-cyanoacrylate;
    2. from about 1 to about 12 parts by weight of a difunctional monomer diester of an acid from the group consisting of acrylic and methacrylic acid and an aromatic diol; and
    3. from about 3 to 20 parts by weight of a thickening agent selected from poly(methylacrylate-coacrylonitrile) polymers;
  B. from 0.1 to 3.0 weight percent based upon the weight of component A of a hydrophobic cyclic imino initiator selected from 2,4,6-tri(allyloxy)-S-triazine, tri(alkyloxy)-S-triazines having 1 to about 20 exocyclic carbon atoms, benzoxazole and substituted benzoxazoles; and
  C. an amount of an organic peroxide free radical providing compound sufficient to cause cross linking of the difunctional monomer diester with the allyl 2-cyanoacrylate.

8 Claims, No Drawings

ALLYL 2-CYANOACRYLATE-BASED ORTHODONTIC BRACKET ADHESIVE

This invention relates to allyl 2-cyanoacrylate-based adhesive compositions which are useful as an orthodontic bracket adhesives. The compositions of this invention are quick setting, gap-filling and possess excellent adhesion to enamel. Additionally these adhesives exhibit highly advantageous hydrolytic stability.

It has been proposed to use as adhesives the monomeric esters of alpha-cyanoacrylic acids having the general formula

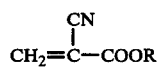

wherein R may be any of the terminal groups consisting of an alkyl group having 1 to 16 carbon atoms, a cyclohexyl group and a phenyl group. Such polymerizable monomer adhesives are described for example in U.S. Pat. No. 2,794,788. Additionally, the use of these cyanoacrylate adhesives as dental elements have been described in U.S. Pat. No. 3,839,065 and U.S. Pat. No. 3,663,501.

Previously, orthodontic brackets have been placed on teeth with bands that were fitted around the teeth and held in place with a zinc phosphate or similar adhesive. This procedure was laborious and time-consuming for the orthodontist and often painful for the patient. Furthermore, the allowance for band thickness between the teeth often necessitated the removal of teeth to achieve adequate spacing. Finally, the banded teeth were often subject to decay as a result of the difficulty encountered in removing food and bacteria from under these bands. In recent years, adhesives have been introduced that enable the adhering of orthodontic brackets to the surface of incisors and molars, thus eliminating the need for banding the teeth. The various bracket adhesive types that have been clinically evaluated include among others, epoxies, acrylic systems, and the bisphenol A-glycidyl methacrylate adducts as well as compositions containing methyl-alpha-cyanoacrylates. See for example, U.S. Pat. No. 3,250,003. The epoxy resins have been limited by their slow cure mechanism and the acrylic systems by their strength properties. The bisphenol A-glycidyl methacrylate systems require time-consuming acid etching, rinsing, drying and a two-step application of adhesive with ultraviolet light polymerization required for each step. According to this invention, an allyl-cyanoacrylate-based adhesive has now been discovered that can be rapidly cured in a thick layer which provides and maintains good adhesion of metal or polycarbonate brackets to the enamel surface of incisors and molars. The adhesives of this invention are further characterized as convenient, quick-setting allyl-cyanoacrylate-based compositions which exhibit their adhesive properties over a 4°-60° C. temperature range for extended periods of time as well as exhibit excellent hydrolytic stability.

Accordingly, there is provided an adhesive composition comprising Components A, B and C as follows:

A. a polymerizable monomeric allyl 2-cyanoacrylate containing portion comprising
1. from 75 to 92 parts by weight of allyl 2-cyanoacrylate;
2. from 1 to about 12 parts by weight of a difunctional monomer diester of an acid from the group consisting of acrylic and methacrylic acid and an aromatic diol; and
3. from 3 to 20 parts by weight of a thickening agent selected from poly(methylacrylate-co-acrylonitrile) polymers (sometimes referred to hereinafter as MA/AN);

B. from 0.1 to 3.0 weight percent based upon the weight of component A of an hydrophobic cyclic imino initiator selected from 2,4,6-tri(allyloxy)-S-triazine, tri(alkyloxy)-S-triazines having 1 to about 20 exocyclic carbon atoms and a benzoxazole having the formula

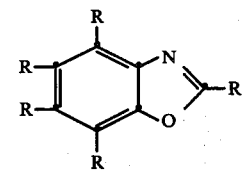

wherein each R is the same or different and represents hydrogen, phenyl, alkyl of 1 to about 20 carbon atoms, chloro or bromo; and C. an amount of an organic peroxide free radical providing compound sufficient to cause cross linking of the difunctional monomer diester with the allyl 2-cyanoacrylate.

The adhesive composition described above is prepared by sequential blending of preferred proportions of the three components A, B and C. After carefully mixing for 30 to 60 seconds, the adhesive may be either applied to the bracket base or to the tooth or both. The bracket is positioned on the tooth with polymerization occurring within 2-7 minutes from the time of mixing. The bracket is then firmly adhered to the tooth after about 10 minutes and the dental wires may be inserted into the brackets.

DESCRIPTION OF COMPONENT A

The allyl 2-cyanoacrylate which is essential to the proper functioning of the invention may be prepared according to the process described in U.S. Pat. No. 3,254,111 incorporated herein by reference. In a preferred embodiment of this invention from 83 to about 91 parts by weight of allyl 2-cyanoacrylate is utilized. It has been found that for the use of the adhesives for orthodontic bracket adhesives small amounts of other alkyl cyanoacrylates can be used in admixture, however, it is preferred that the allyl 2-cyanoacrylate be utilized by itself. It has been surprisingly found that the allyl 2-cyanoacrylate exhibits highly advantageous adhesive properties over other cyanoacrylates for use in orthodontic bracket adhesive compositions. It is theorized one of the advantages is due to the crosslinking capability of the allyl group.

The difunctional monomer diester of an acid from the group consisting of acrylic and methacrylic acid and an aromatic diol and further identified as part Component A(2) is present as a cross-linking agent and aids the composition of the invention by increasing the hardness of the polymerized composition and improving the resistance of the adhesive to aqueous environments, resulting in improved bracket bonding to teeth. In a preferred embodiment of the invention 1 to about 8 (1 to 5 being even more preferred) parts by weight cross-linking agent is utilized. It is essential that the compounds be prepared from acrylic or methacrylic acid and an aromatic diol. It has been found that when other than aromatic diols are used the polymerized compositions are softer and easily penetrated with a sharp dental explorer. Examples of suitable cross-linking agents are p-xylene glycol bisacrylate, bisphenol A diacrylate, bis(hydroxyethyl terephthalate) diacrylate, bisphenol A dimethacrylate and the like. The preferred difunctional monomer diester utilizable in the practice of this invention is bisphenol A dimethacrylate.

The polymeric thickner identified in Component A(3) is generally present in the amount of from 3 to 20 parts by weight. Preferably, the amount of thickening agent utilized is from about 7 to about 15 parts by weight. The thickner, of course, is added to impart the desired flow properties required for proper application and placement of the orthodontic bracket in the tooth. It has been found, however, that the typical well-known thickening agents usually utilized for thickening cyanoacrylate adhesives are not generally acceptable for the use intended for the compositions of this invention. It has been found surprisingly that the polymer selected from poly(methylacrylate-co-acrylonitrile) polymers exhibit the desired properties. In a preferred embodiment of this invention the polymeric thickener is poly(-methylacrylate-co-acrylonitrile) derived from an 80/20 to 20/80 wt. % ratio of the respective comonomers. Especially preferred are the polymers derived from a 60/40 weight % ratio of the respective monomers.

DESCRIPTION OF COMPONENT B

The hydrophobic cyclic imino initiator identified as component B in the compositions of this invention is selected from 2,4,6-tri(allyloxy)-S-triazine, tri(alkyloxy)-S-triazines having 1 to about 10 exocyclic carbon atoms and benzoxazoles having the formula

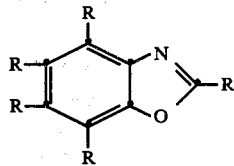

wherein each R is the same or different and represents hydrogen, phenyl, alkyl of 1 to about 20 carbon atoms, chloro or bromo. Preferably R is selected from hydrogen and methyl. Specific examples of these compounds are 2,4,6-tri(methoxy)-S-triazine, benzoxazole, 2,3,4-trimethyl benzoxazole, 2,4,6-tri(decyloxy)-S-triazene and the like. It is to be noted, however, that the common initiators as disclosed in U.S. Pat. No. 3,839,065 and U.S. Pat. No. 3,940,362 are unsuitable for use in the present invention. It has been found that the amine activators listed therein do not provide a sufficiently controlled polymerization for the intended purpose of this invention. In a preferred embodiment of this invention the amount of initiator utilized based on the weight of component A is in the range of from 0.3 to about 2.5 weight percent. The preferred initiators are 2,4,6-tri(allyloxy)-S-triazine and 2,4,6-tri(n-propoxy)-S-triazine. These initiators may be obtained commercially or prepared in a manner well known in the art. See for example U.S. Pat. No. 3,163,647.

DESCRIPTION OF COMPONENT C

The organic free radical providing compound identified as Component C in the composition of this invention is a organic peroxide such as those commonly used to affect initiation of polymerization reactions that proceed by means of a free radical mechanism. Examples of such catalysts include aromatic peroxides, including benzoyl peroxide and α-cumyl hydroperoxide, benzoyl peroxide being preferred. Other useful peroxides are lauroyl peroxide, cyclohexanone peroxide, tert-butyl perbenzoate, diisopropyl peroxydicarbonate and the like.

It is suitable that the free radical be employed in a quantity of from about 2–15 parts by weight for each hundred parts by weight of component A.

The pre-polymerized composition of this invention, at the time immediately proceeding reaction, thus comprises a component A comprising the monofunctional monomer and the difunctional monomer, a portion comprising the free radical catalysts component B and a cyclic imino activator portion component C.

Because contact of the imino initiator with the monofunctional monomer will initiate polymerization, it is essential that such contact not occur until polymerization is desired. On the other hand, the free radical compound, in the absence of ultra-violet light or extreme heat remains quiescent until the reaction mixture becomes warmed by the heat of reaction upon initiation with the imino activator.

Therefore, a packaged commercial system could be a three component system comprised of component A. The adhesive with allyl 2-cyanoacrylate, MA/AN thickener, and diacrylate,
B. the imino initiator; and
C. the peroxide.

The peroxide may be added to the adhesive component A on the day of use and will remain stable for 7–10 days. The initiator will either be swabbed on the tooth in ethanol and allowed to evaporate before bracket application or dropped into the adhesive just prior to bracket placement. The first method (surface application on tooth) allows for the placement of a large number of brackets from one mix of adhesive. Addition of the activator into the adhesive allows for the placement of 2–4 brackets from one mix of adhesive before polymerization begins.

This invention will be further illustrated by the following examples although it will be understood that these examples are included merely for purposes of illustration and are not intended to limit the scope of the invention.

EXAMPLE 1

This example describes the preparation, application, and testing of a clear cyanoacrylate-based orthodontic bracket adhesive.

Into a three-inch-diameter aluminum cup is added 0.3 grams of solution previously prepared from 8.5 grams allyl 2-cyanoacrylate and 1.5 grams 60/40 poly(methyl acrylate-co-acrylonitrile). Twelve milligrams of bis(hydroxyethyl terephthalate)diacrylate and 1.5 milligrams of benzoyl peroxide are added and carefully stirred until dissolved. One drop (~0.02 gram) of initiator solution, previously prepared by dissolving 5 grams of 2,4,6-tri(allyloxy)-S-triazine (also called triallyl cyanurate) in 5 grams of dioctyl phthalate, is added and stirred for 30–60 seconds with the other components. The base of a metal orthodontic bracket is dipped into the adhesive, and the metal bracket is placed on the acid-etched enamel surface of an extracted incisor. The bracket is held in position on the tooth for approximately one minute. Dental wires may be placed through the brackets within 10-15 minutes after application of the bracket to the tooth. After six hours in 60° C. water and one hour of cycling one minute each between 4° C. and 60° C. water, tensile strengths for this composition with metal brackets were determined to be ~700 psi. Tests conducted in the same manner on a commercial bisphenol A/glycidyl methacrylate system gave tensile strengths of ~600 psi.

EXAMPLE 2

This example describes the formulation of a bracket adhesive and its testing.

A 0.4 gram solution previously prepared from 8.5 grams allyl 2-cyanoacrylate and 1.5 grams 60/40 poly(methyl acrylate-co-acrylonitrile) is added to a three-inch-diameter aluminum cup. Two milligrams p-xylylene glycol bisacrylate and 0.5 milligram benzoyl peroxide are added and carefully stirred until dissolved. One drop (~0.02 gram) of initiator solution, previously prepared by dissolving 1.5 grams triallyl cyanurate in 5 grams dioctyl phthalate, is added and stirred ~30 seconds with the other components. The base of a polycarbonate bracket is dipped into the adhesive and the bracket is placed on the acid-etched enamel surface of an extracted incisor. The bracket is held in position for approximately one minute. Dental wires may be placed through the brackets within 10-15 minutes after application of the bracket to the tooth. Tensile strengths were determined to be ~600 psi. Tests conducted in the same manner on the commercial bisphenol A/glycidyl methacrylate system gave tensile strengths of ~600 psi.

EXAMPLE 3

A 0.3 gram solution previously prepared from 9.0 g. allyl 2-cyanoacrylate and 1.0 g. poly(methyl methacrylate) thickener is added to a 3 inch diameter aluminum cup. Twelve mgs. bisphenol A dimethacrylate and 5 mgs. benzoyl peroxide are added and carefully stirred until dissolved. A 20% solution of 2,4,6-tri(allyloxy)-5-triazine in ethanol is swabbed with cotton on the acid etched enamel surface of extracted incisors. The base of a metal bracket is dipped into the adhesive, and the brackets are placed on the surface of the incisors. The bracket is held in position for ~30 seconds. The incisors with adhered brackets are placed in a 75° C. constant temperature bath for 24 hrs. They are then removed from the bath and cycled for 1 hr. between 60° C. and ice water (1 min. each). There is a 75% retention of the brackets on the teeth. Tensile strengths determined on the retained brackets were ~260 psi. Using the same formulation with 60/40 MA/AN, there was 100% retention of the brackets after aging with tensile strengths of ~400 psi.

EXAMPLE 4

A 0.3 gram solution previously prepared from 9.0 g. allyl 2-cyanoacrylate, 1.0 g. MA/AN (IV = 1.0), and 0.8 g. bisphenol A dimethacrylate was added to a 3 inch diameter aluminum cup. 5 mgs. benzoyl peroxide are added and carefully stirred until dissolved. Three incisors are swabbed with a 10% solution of 2,4,6-tri(n-propoxy)-S-triazine and three with a 5% solution of dimethyl aniline (DMA) in acetone. Brackets are applied to the teeth by dipping the bracket base in the adhesive formulation. The teeth with adhered brackets are placed in a 75° C. constant temperature bath for 24 hrs. They are then removed from the bath and cycled for 1 hr. between 60° C. and ice water (1 min. each). One of the brackets with DMA activator came off after 24 hrs. at 75° C. The average tensile strength with DMA was determined to be 303 psi. Using 2,4,6-tri(n-propoxy)-S-triazine there was 100% retention of the brackets and an average tensile strength of 375 psi.

EXAMPLE 5

A 0.3 g. solution previously prepared from 9.0 g. methylcyanoacrylate and 1.0 g. poly(methylmethacrylate) thickener is added to an aluminum dish. Twelve mgs. of bisphenol A dimethacrylate and one drop (~0.03 g.) of 9.1% benzoyl peroxide in dimethylphthalate are added and carefully stirred until dissolved. A 25% solution of triallyl cyanurate in ethanol is swabbed with cotton on the acid etched enamel surface of extracted incisors and allowed to evaporate. The base of a metal bracket is dipped into the adhesive, and the brackets are placed on the surface of the incisors. The bracket is held in position for ~30 secs. The incisors with adhered brackets are placed in a 75° C. constant temperature bath for 24 hours. They are then removed from the bath and cycled for 1 hour between 60° C. and ice water (1 min. each). One of the three brackets came off the tooth after 24 hours at 75° C. and another came off after cycling. The tensile strength of the third bond was determined to be 211 psi. Using the same formulation with allyl cyanoacrylate rather than methyl cyanoacrylate there was 100% retention of the brackets after aging and an average tensile strength of 494 psi.

The invention has been described in detail with particular reference to preferred embodiments thereof, but it will be understood that variations and modifications can be effected within the spirit and scope of the invention.

We claim:

1. A solidified adhesive compound exhibiting hydrolytic stability which solidified adhesive compound results from combining components A, B and C as follows:
  A. a polymerizable monomeric allyl 2-cyanoacrylate containing portion prepared from
    1. from 75 to about 92 parts by weight of allyl 2-cyanoacrylate;
    2. from 1 to about 12 parts by weight of a difunctional monomer diester of an acid from the group consisting of acrylic and methacrylic acid and a diol having an aromatic nucleus; and
    3. from 3 to about 20 parts by weight of a thickening agent selected from poly(methylacrylate-co-acrylonitrile) polymers;
  B. from 0.1 to about 3 weight percent based upon the weight of component A of a hydrophobic cyclic imino initiator selected from the group consisting of 2,4,6-tri(allyloxy)-S-triazine, tri(alkyloxy)-S-triazines having 1 to about 20 exocyclic carbon atoms; and benzoxazoles having the formula

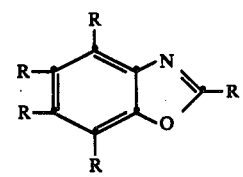

wherein each R is the same or different and represents hydrogen, phenyl, alkyl of 1 to about 20 carbon atoms, chloro or bromo; and C. an amount of an organic peroxide free radical providing compound sufficient to cause crosslinking of the difunctional monomer diester with the allyl 2-cyanoacrylate.

2. A solidified adhesive compound exhibiting hydrolytic stability which solidified adhesive compound results from combining components A, B and C as follows:

A. a polymerizable monomeric allyl 2-cyanoacrylate containing portion prepared from
   1. from 75 to about 92 parts by weight of allyl 2-cyanoacrylate;
   2. from 1 to about 12 parts by weight of a difunctional monomer diester of an acid from the group consisting of acrylic and methacrylic acid an a diol having an aromatic nucleus; and
   3. from 3 to about 20 parts by weight of a thickening agent selected from poly(methylacrylate-co-acrylonitrile) polymers;
  B. from 0.1 to about 3.0 weight percent based upon the weight of component A of a cyclic imino initiator selected from the group consisting of 2,4,6-tri(allyloxy)-S-triazine and tri(alkyloxy)-S-triazines having 1 to about 20 exocyclic carbon atoms; and
  C. an amount of an organic peroxide free radical providing compound sufficient to cause crosslinking of the difunctional monomer diester with the allyl 2-cyanoacrylate.

3. A solidified adhesive compound exhibiting hydrolytic stability which solidified adhesive compound results from combining components A, B and C as follows:

A. a polymerizable monomeric allyl 2-cyanoacrylate containing portion prepared from
   1. from 83 to 91 parts by weight of allyl 2-cyanoacrylate;
   2. from 1 to about 8 parts by weight of a difunctional monomer diester of an acid from the group consisting of acrylic and methacrylic acid and a diol having an aromatic nucleus; and
   3. from 7 to about 15 parts by weight of a thickening agent selected from poly(methylacrylate-co-acrylonitrile) polymers;
  B. from 0.3 to about 2.5 weight percent based upon the weight of component A of a cyclic imino initiator selected from the group consisting of 2,4,6-tri(allyloxy)-S-triazine and tri(alkyloxy)-S-triazines having 1 to about 20 exocyclic carbon atoms; and
  C. an amount of an organic peroxide free radical providing compound sufficient to cause crosslinking of the difunctional monomer diester with the allyl 2-cyanoacrylate.

4. A solidified adhesive compound exhibiting hydrolytic stability which solidified adhesive compound results from combining components A, B and C as follows:

A. a polymerizable monomeric allyl 2-cyanoacrylate containing portion prepared from
   1. from 83 to about 91 parts by weight of allyl 2-cyanoacrylate;
   2. from 1 to about 8 parts by weight of a difunctional monomer diester selected from the group consisting of bisphenol A dimethacrylate, bis(hydroxyethyl terephthalate), diacrylate, and p-xylylene glycol bisacrylate;
   3. from 7 to about 15 parts by weight of a thickening agent selected from poly(methylacrylate-co-acrylonitrile) polymer derived from an 80/20 to 20/80 weight % ratio of the methyl acrylate to acrylonitrile comonomer;
  B. from 0.3 to about 2.5 weight percent based on the weight of component A of a cyclic imino initiator selected from the group consisting of 2,4,6-tri(allyloxy)-S-triazine and 2,4,6-tri(propoxy)-S-triazines; and
  C. an amount of an organic peroxide free radical providing compound sufficient to cause crosslinking of the difunctional monomer diester with the allyl 2-cyanoacrylates.

5. The composition of claim 4 wherein the difunctional monomer diester is bisphenol A dimethacrylate, the thickening agent is poly(60 wt. % methyl acrylate-co-40 wt. % acrylonitrile) and the initiator is 2,4,6-tri(n-propoxy)-S-triazine.

6. The composition of claim 5 wherein the free radical providing compound is benzoyl peroxide.

7. The composition of claim 4 wherein the difunctional monomer diester is bisphenol A dimethacrylate, the thickening agent is poly(60 wt. % methyl acrylate-co-40 wt. % acrylonitrile) and the initiator is 2,4,6-tri(allyloxy)-S-triazine.

8. The compositon of claim 7 wherein the free radical providing compound is benzoyl peroxide.

* * * * *